United States Patent
Ono et al.

[11] Patent Number: 6,120,187
[45] Date of Patent: Sep. 19, 2000

[54] PLAIN BEARING

[75] Inventors: Akira Ono; Koichi Yamamoto; Takayuki Shibayama, all of Nagoya, Japan

[73] Assignee: Daido Metal Company Ltd., Nagoya, Japan

[21] Appl. No.: 09/064,522

[22] Filed: Apr. 23, 1998

[30] Foreign Application Priority Data

Apr. 29, 1997 [JP] Japan ..................................... 9-126417

[51] Int. Cl.[7] .................................................. F16C 17/02
[52] U.S. Cl. ........................................... 384/273; 384/294
[58] Field of Search .................................... 384/294, 288, 384/291, 295, 296, 276, 273

[56] References Cited

FOREIGN PATENT DOCUMENTS

| | | |
|---|---|---|
| 58-144123 | 9/1983 | Japan . |
| 62-028922 | 2/1987 | Japan . |
| 1577562 | 10/1980 | United Kingdom . |
| 9527857 | 10/1995 | WIPO . |

*Primary Examiner*—Lenard A. Footland
*Attorney, Agent, or Firm*—Browdy and Neimark

[57] ABSTRACT

A main-load side bearing metal piece on which a heavy load is imposed is coated on an inner surface thereof with a thin overlay having a uniform thickness. Meanwhile, a non-load side bearing metal piece is coated on an inner surface thereof with an overlay having a uniform thickness greater than that of the overlay formed on the inner surface of the main-load side bearing metal piece. With this construction, the bearing metal piece shows excellent load carrying capacity and fatigue resistance because the overlay formed on the inner surface thereof is thin, while the non-load side bearing metal piece shows excellent foreign matter embeddability and conformability because the overlay formed on the inner surface thereof is thick. Moreover, since there are formed the overlays each having a uniform thickness in respective inner surfaces of each of the bearing metal pieces, and therefore it is possible to reduce the manufacturing cost.

6 Claims, 5 Drawing Sheets

PLAIN BEARING

BACKGROUND OF THE INVENTION

The present invention relates to a plain bearing, and more particularly to a plain bearing in which two pieces of bearing metal each having a semicylindrical shape are combined together.

Heretofore, multilayer plain bearings of the type that a sliding surface of each bearing metal piece with backing metal is coated with a soft overlay, have been known as the plain bearings used for a bearing in a big end portion of a connecting rod and for a main bearing in an internal combustion engine which rotates at high speed and on which a heavy load is imposed. The purpose of forming the overlay is not only to improve the conformability but also to provide a surface which can embed foreign particles which would enter between the sliding surface of the plain bearing and the shaft so as to prevent seizure. Herein, it is generally known that increasing the thickness of the overlay enhances the embeddability and conformability but deteriorates the load carrying capacity and fatigue resistance. Thus, the thickness of the overlay is made to be in the range of 10 to 30 micro meters ($\mu$m) in, for example, an engine such as an automobile engine.

Herein, in the plain bearing which is composed of two pieces of semicylindrical bearing metal combined together and assembled into a housing, one of the two pieces of bearing metal which is imposed with a heavier load on an inner surface thereof will be referred to as a bearing metal piece located on a main-load side, while the other bearing metal piece which is imposed with a lighter load on an inner surface thereof will be referred to as a bearing metal piece located on a non-load side. There have conventionally been disclosed various types of plain bearings paying attention to a difference in load which is imposed on respective surfaces of these two bearing metal pieces.

JP-U-58-144123 (Prior Art 1) discloses a plain bearing in which one bearing metal piece located on a main-load side is coated with an overlay on an inner surface thereof, while the other bearing metal piece located on a non-load side is not coated with an overlay on an inner surface thereof. It says in this publication that the above construction makes it possible to provide a low-cost plain bearing.

Further, JP-U-62-28922 (Prior Art 2) discloses a plain bearing in which two pieces of bearing metal are each coated by plating with an overlay having a greater thickness than usual, the whole sliding surface of each of the bearing metal pieces being subjected to an eccentric surface finishing so that the overlay thickness is equal in the center axis direction of each of the bearing metal pieces but different between a center portion and opposite end portions of each of the bearing metal pieces in the circumferential direction thereof. It says in this publication that the above construction makes it possible to provide a plain bearing which is excellent in foreign matter embeddability, load carrying capacity and fatigue resistance.

SUMARY OF THE INVENTION

However, according to the plain bearing of the Prior Art 1, since the non-load side bearing metal piece is not coated with the overlay on the inner surface thereof, it is inferior in foreign matter embeddability and thus liable to cause seizure.

Further, according to a plain bearing of the Prior Art 2, the bearing metal pieces are each coated by plating with the overlay having a greater thickness than usual on the inner surface thereof and then subjected to the eccentric surface finishing, and therefore it is necessary to form thick layers by plating and to perform the eccentric surface finishing process after the two pieces of bearing metal have been combined together into a bearing assembly, thus the manufacturing cost of the plain bearing is inevitably too high.

Therefore, it is an object of the present invention to provide a low-cost plain bearing which is excellent not only in anti-seizure property but also in load carrying capacity and fatigue resistance.

According to the feature of the present invention, there is provided a plain bearing in which two pieces of bearing metal are combined together, one bearing metal piece located on a main-load side is coated on an inner surface thereof with a thin overlay having a uniform thickness, while the other bearing metal piece located on a non-load side is coated on an inner surface thereof with an overlay having a uniform thickness greater than that of the overlay formed on the inner surface of the main-load side bearing metal piece.

With this construction, the main-load side bearing metal piece on which a heavy load is imposed shows excellent load carrying capacity and fatigue resistance because the overlay formed on the inner surface thereof is thin. Meanwhile, the non-load side bearing metal piece shows excellent foreign matter embeddability and conformability because the overlay formed on the inner surface thereof has a thickness greater than that of the overlay formed on the inner surface of the main-load side bearing metal piece. Further, since the overlays are each formed having a uniform thickness in respective inner surfaces of each of the bearing metal pieces, it is possible to reduce the manufacturing cost.

According to another feature of the present invention, there is provided a plain bearing in which two pieces of bearing metal are combined together, wherein one bearing metal piece located on a main-load side is coated on an inner surface thereof with an overlay having a thickness that is smallest at a portion where a maximum load is imposed and increases gradually toward opposite circumferential side edges thereof, while the other bearing metal piece located on a non-load side is coated on an inner surface thereof with an overlay having a uniform thickness greater than that of the overlay at the portion where the maximum load is imposed.

With this construction, the main-load side bearing metal piece on which a heavy load is imposed can be drastically improved in load carrying capacity and fatigue resistance because the thickness of the overlay formed thereon is smallest at the portion where the maximum load is imposed. Further, the thickness of the overlay is increased gradually toward the opposite circumferential side edges thereof, and therefore it is possible to enhance the foreign matter embeddability and conformability as well as load carrying capacity and fatigue resistance. Meanwhile, the non-load side bearing metal piece has excellent foreign matter embeddability and conformability because the overlay formed thereon has a uniform thickness greater than that of the overlay formed on the inner surface of the main-load side bearing metal piece. Accordingly, it is possible to provide a plain bearing which as a whole is excellent in load carrying capacity, fatigue resistance, foreign matter embeddability, conformability and anti-seizure property, and which is low in price.

As described above, according to the present invention, one bearing metal piece located on a main-load side is coated on an inner surface thereof with a thin overlay having a uniform thickness, while the other bearing metal piece located on a non-load side is coated on an inner surface thereof with an overlay having a uniform thickness greater than that of the overlay formed on the inner surface of the main-load side bearing metal piece, and therefore it is possible to provide a plain bearing which is excellent in load carrying capacity, fatigue resistance, foreign matter embeddability and conformability, and which is low in price.

According to the present invention, one bearing metal piece located on a main-load side is coated on an inner surface thereof with an overlay having a thickness that is smallest at a portion where a maximum load is imposed and increases gradually toward opposite circumferential side edges thereof, while the other bearing metal piece located on a non-load side is coated on an inner surface thereof with an overlay having a uniform thickness greater than that of the overlay at the portion where the maximum load is imposed, and therefore it is possible to provide a plain bearing which is excellent in load carrying capacity, fatigue resistance, anti-seizure property, foreign matter embeddability and conformability, and which is low in price.

DETAILED DESCRIPTION OF THE PREFERRED EMBODIMENTS

This invention will be described in further detail with reference to the accompanying drawings.

Figure 1:
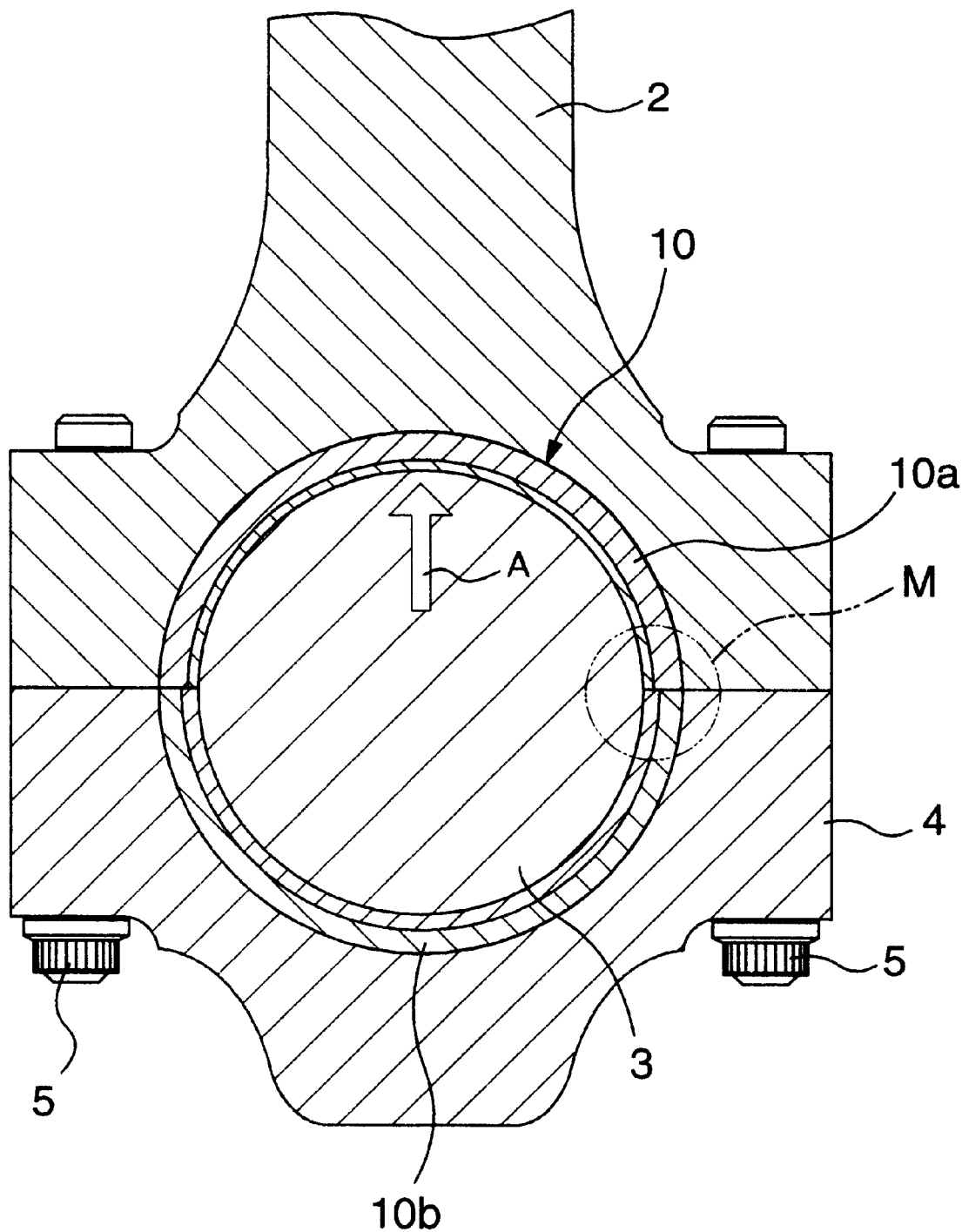
FIG. 1 is a sectional view of a plain bearing according to a first embodiment of the present invention, which illustrates a state of two bearing metals being assembled into a housing.

FIG. 1 shows a plain bearing 10 fixed to a connecting rod 2 of an automobile engine. A shaft 3 is rotatably supported by a sliding surface of the plain bearing 10. A cap 4 is fixed to a big end portion of the connecting rod 2 with a plurality of bolts 5 so as to form a housing. A heavy bearing load, that is, a main load is imposed on an upper portion of the plain bearing 10 as shown by an arrow mark A in FIG. 1.

Figure 2:
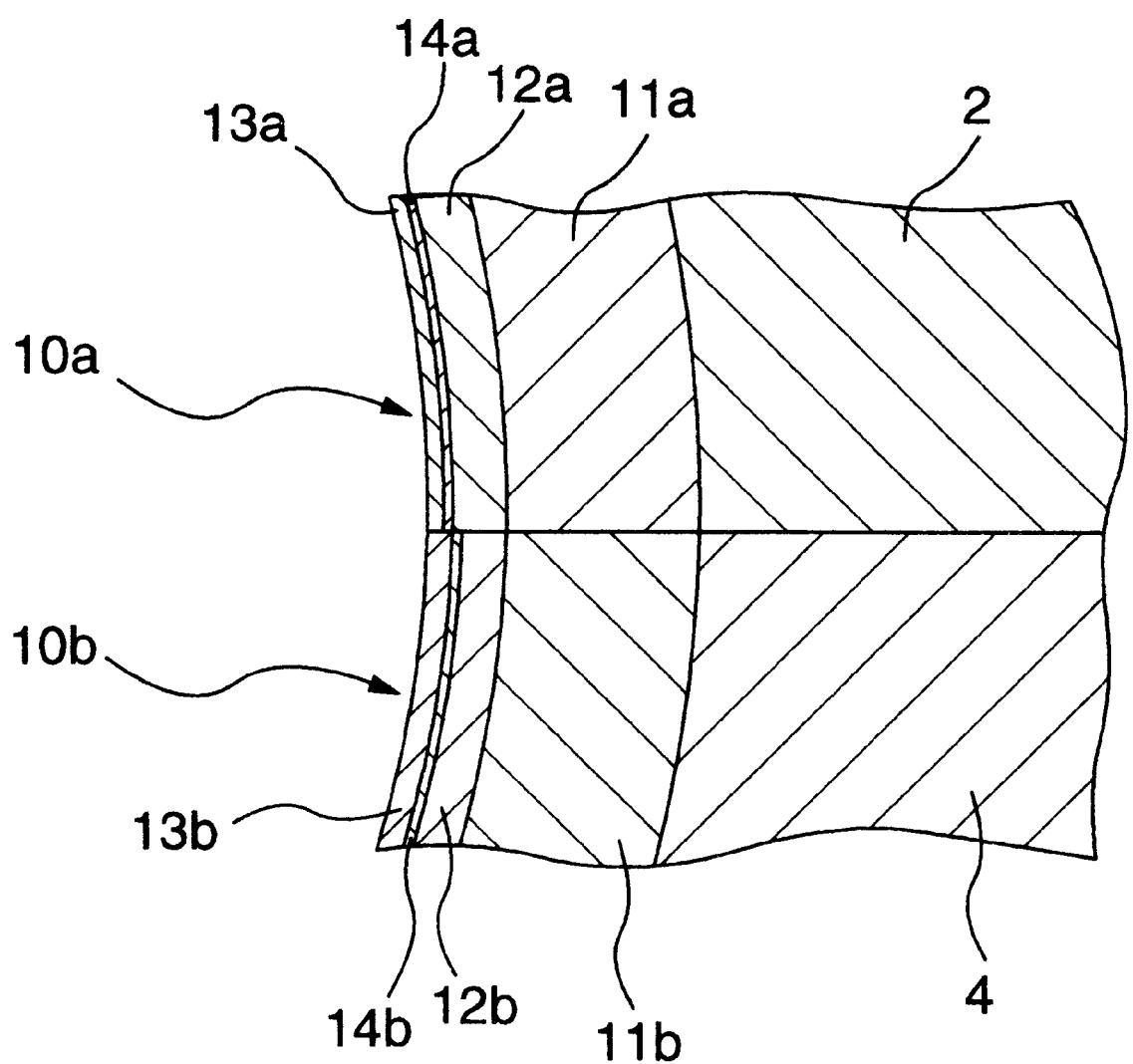
FIG. 2 is an expanded sectional view of is a portion M in FIG. 1.

The plain bearing 10 is composed of two pieces of semicylindrical bearing metal 10a, 10b combined together at their edges so as to be in the shape of a cylinder. The upper bearing metal piece 10a is the one located on the main-load side. As shown in FIG. 2, the bearing metal piece 10a comprises a backing metal 11a made of steel and having a thickness of 1.7 mm, a bearing alloy layer 12a made of copper alloy and having a thickness of 0.3 mm, and a soft overlay 13a made of lead alloy and having a uniform thickness of 10 μm, the backing metal 11a and the bearing alloy layer 12a being joined together, and the overlay 13a being coated by plating on the bearing alloy layer 12a. Incidentally, an intermediate layer 14a made of nickel and having a thickness of 1 μm is put and thus formed between the bearing alloy layer 12a and the overlay 13a. It is noted that the intermediate layer 14a is coated for the purpose of preventing an element of the overlay 13a from diffusing into the bearing alloy layer 12a.

Meanwhile, the lower bearing metal piece 10b is the one located on the non-load side, and it has substantially the same structure as the upper bearing metal piece 10a. A backing metal 11b has a thickness of 1.7 mm as in the case of the bearing metal piece 10a. A bearing alloy layer 12b has a thickness of 0.29 mm. Further, an overlay 13b having a uniform thickness of 20 μm is coated on the bearing alloy layer 12b with an intermediate layer 14b made of nickel interposed between them, the thickness of the overlay 13b being twice that of the overlay 13a of the bearing metal piece 10a, and the thickness of the intermediate layer 14b being 1 μm.

According to the plain bearing 10 of this first embodiment, the overlay 13a of the upper bearing metal piece 10a located on the main-load side is formed thinly by plating, and therefore it is possible to reduce the manufacturing cost as compared with the case of forming a thick plating, and it is also possible to provide a plain bearing which has excellent load carrying capacity and fatigue resistance. On the other hand, in the bearing metal piece 10b located on the non-load side, the overlay 13b has a thickness equal to that of the overlay of the non-load side bearing metal piece of the conventional plain bearing composed of upper and lower identical bearing metal pieces combined together, thereby making sure of excellent foreign matter embeddability and conformability. Particularly for the overlay 13b of the non-load side bearing metal piece, it is not so necessary to take account of load carrying capacity and fatigue resistance. The overlay of the non-load side bearing metal piece may be formed to have a thickness of 30 μm, in which case it is possible to provide a plain bearing whose embeddability and conformability are further enhanced.

Accordingly, it is possible to make the plain bearing 10 not only excellent in load carrying capacity, fatigue resistance, foreign matter embeddability and conformability but also low in price.

Incidentally, in this first embodiment, the thickness of each of the overlays is 10 μm, 20 μm, respectively and however it is also possible that the overlay of the bearing metal piece located on the main-load side has a thickness of 2 to 15 μm, while the overlay of the bearing metal piece located on the non-load side has a relative thickness obtained by adding 3 to 30 μm to the thickness of the overlay of the main-load side bearing metal piece.

Figure 3A:
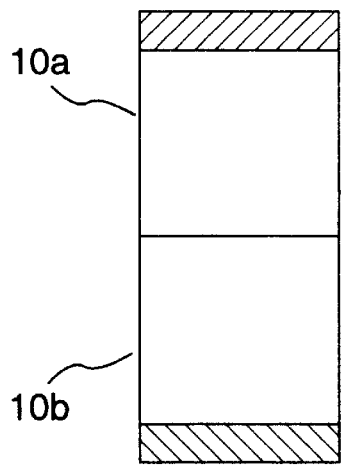
FIGS. 3A to 3G are axial sectional views.
Figure 3B:
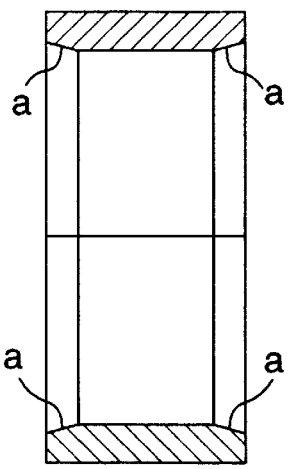
Figure 3C:
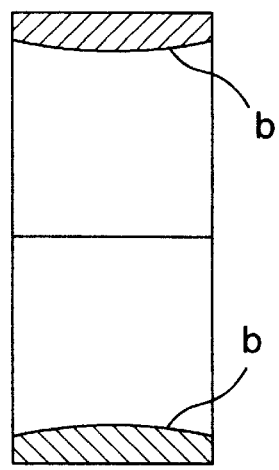
Figure 3D:
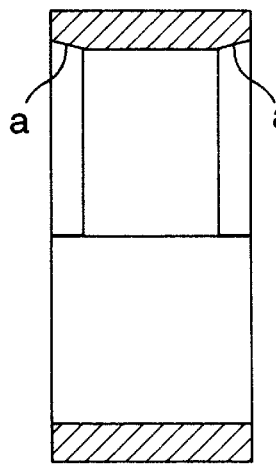
Figure 3E:
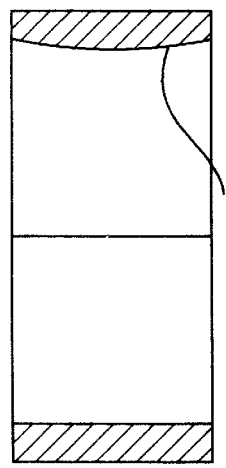
Figure 3F:
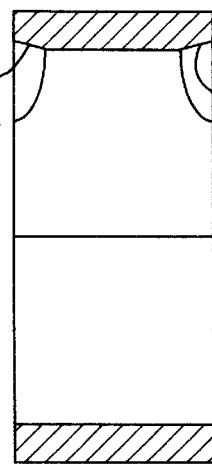
Figure 3G:
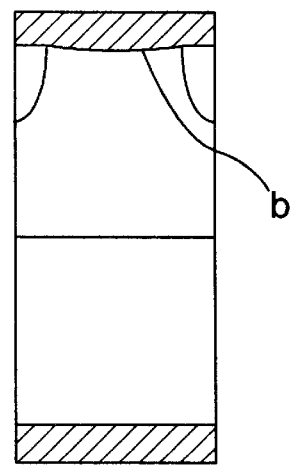

FIG. 3A shows an axial sectional view of the plain bearing 10 whose structure is entirely the same along the axial direction thereof. FIGS. 3B and 3C show other structures in which the inner surface has undergone what is called machining into a crowned shape at opposite axial end portions thereof so as to further improve the conformability. In the plain bearing of FIG. 3B, a substantially straight recessed portion a is formed at the opposite end portions of the inner surface. Meanwhile, in the plain bearing of FIG. 3C, the sliding surface is formed by a convex surface b curved gently along the axial direction thereof. Furthermore, in the plain bearing shown in each of FIGS. 3B and 3C, only the upper bearing metal piece may be wholly or locally subjected to the machining into a crowned shape (FIGS. 3D–3G).

Figure 4:
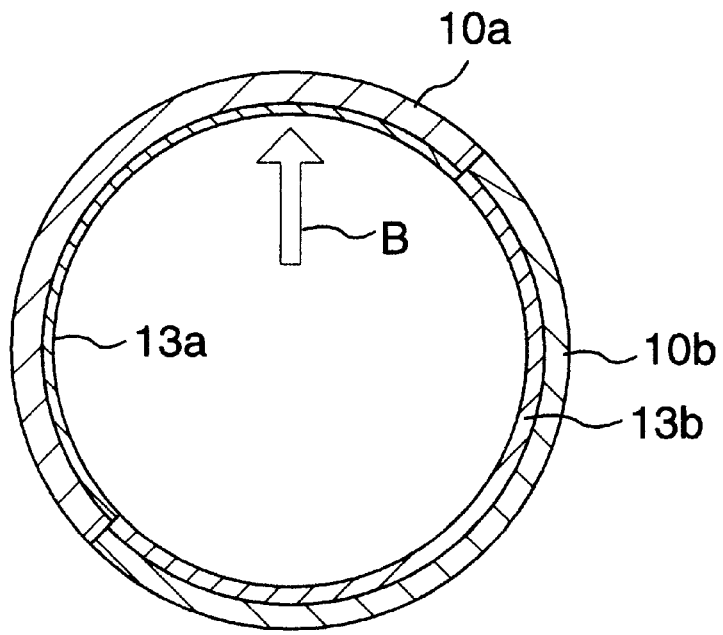
FIG. 4 is a sectional view of the plain bearing, which illustrates a state of two bearing metals being assembled in a slant position.

FIG. 4 shows the plain bearing in the case of being applied to such a housing that the big end portion of the connecting rod is formed with its axis tilted at an angle of 45 degrees and the cap 4 is fixed thereto in the same manner. Upward load is imposed on the main-load side bearing metal piece as shown by an arrow mark B. Since the big end portion of the connecting rod is formed with its axis tilted at an angle of 45 degrees as described above, the bearing metal pieces 10a, 10b shown in FIG. 1 are assembled slantingly at an angle of 45 degrees.

Figure 5:
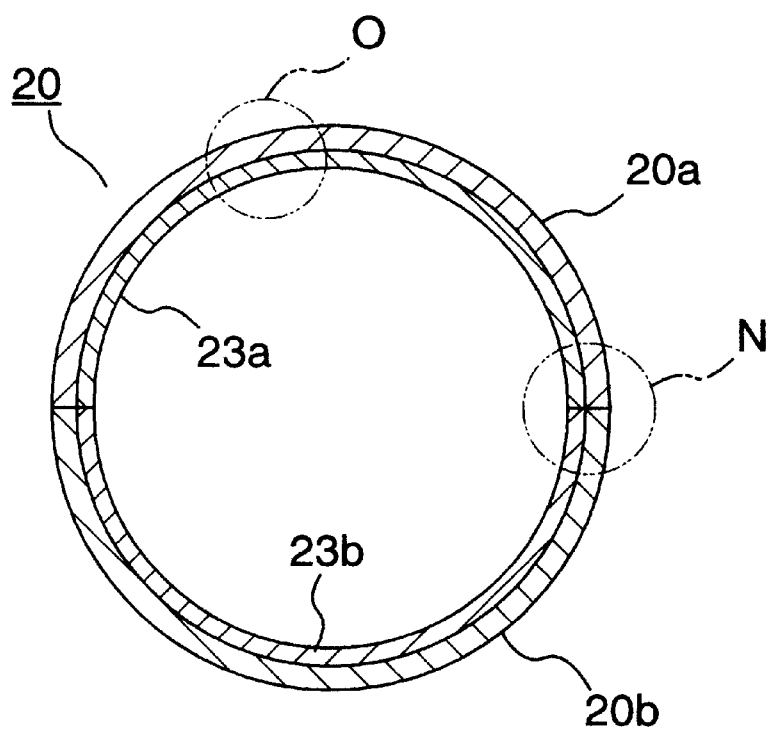
FIG. 5 is a sectional view of a plain bearing according to a second embodiment of the present invention.
Figure 6:
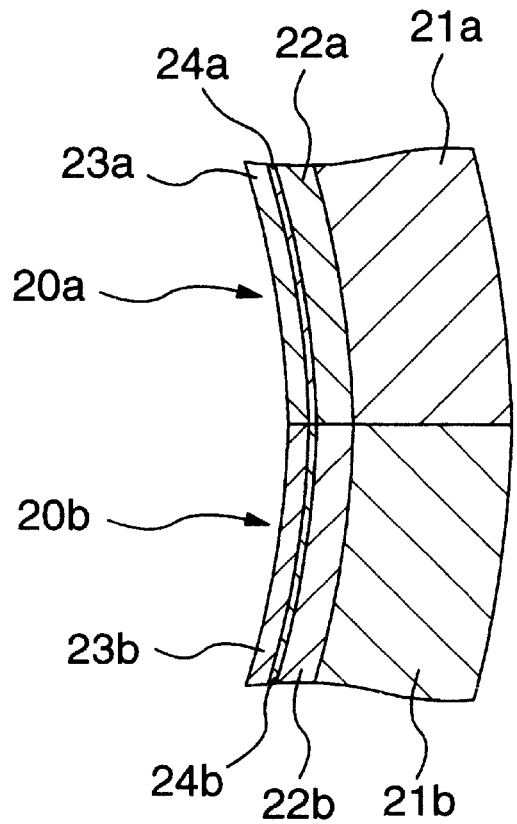
FIG. 6 is an expanded sectional view of is a portion N of FIG. 5.
Figure 7:
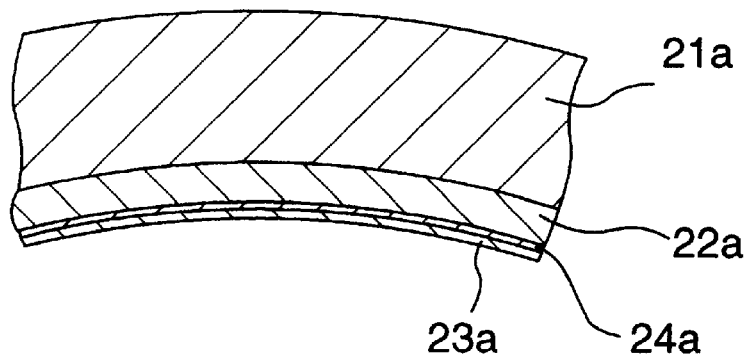
FIG. 7 is an expanded sectional view of a portion O of FIG. 5.

FIGS. 5 to 7 show a plain bearing according to a second embodiment of the present invention. A plain bearing 20 is composed of two pieces of semicylindrical bearing metal 20a, 20b combined together at their edges so as to be in the shape of a cylinder. As shown in FIG. 6, the upper main-load side bearing metal piece 20a on which a heavy load is imposed comprises a backing metal 21a made of steel and having a thickness of 2.2 mm, a bearing alloy layer 22a made of copper alloy and having a thickness of 0.30 to 0.32 mm, and an intermediate layer 24a made of nickel and having a thickness of 1 $\mu$m, the backing metal 21a and the bearing alloy layer 22a being joined together, and the intermediate layer 24a being formed on the bearing alloy layer 22a. The intermediate layer 24a is coated by plating with a soft overlay 23a made of lead alloy. The overlay 23a is then machined by boring working so as to have the smallest thickness of 10 $\mu$m at a portion where the maximum load is imposed (see FIG. 7). Further, the overlay 23a is increased gradually in thickness as going toward the opposite circumferential edges thereof so as to have a thickness of 30 $\mu$m thereat (see FIGS. 5 and 6).

Meanwhile, the lower bearing metal piece 20b has substantially the same structure as the upper bearing metal piece 20a. A backing metal 21b has a thickness of 2.2 mm as in the case of the bearing metal piece 20a. A bearing alloy layer 22b has a thickness of 0.3 mm. An overlay 23b having a uniform thickness of 30 $\mu$m is coated on the bearing alloy layer 22b with an intermediate layer 24b interposed between them, the thickness of the intermediate layer 24b being 1 $\mu$m.

In the plain bearing 20 according to the second embodiment, the thickness of the overlay 23a is made smallest at the portion of the inner surface of the bearing metal piece 20a where the maximum load is imposed, and therefore the plain bearing can have excellent load carrying capacity and fatigue resistance. Further, it is possible to reduce the manufacturing cost as compared with the case of the Prior Art 2 in which the two pieces of bearing metal are combined together and then made to undergo the eccentric surface finishing process, because the thickness of coating formed by plating on the inner surface of the upper bearing metal piece 20a located on the main-load side can be controlled only by the plating process without making the inner surface of the bearing metal piece 20a undergo any special surface finishing process. On the other hand, the inner surface of the bearing metal piece 20b located on the non-load side need not undergo the surface finishing process but it is coated with the overlay 23b having a uniform thickness, and therefore it is possible to make sure of the foreign matter embeddability, conformability and anti-seizure property as well as to reduce the manufacturing cost.

Incidentally, in this second embodiment, description has been made about the case where the overlay has a thickness of 10 $\mu$m at the portion where the maximum load is imposed and the overlay of the non-load side bearing metal piece has a thickness of 30 $\mu$m, and however it is also possible that the overlay has a thickness of 2 to 15 $\mu$m at the portion where the maximum load is imposed, while the overlay of the non-load side bearing metal piece has a relative thickness obtained by adding 3 to 30 $\mu$m to the thickness of the overlay at the portion where the maximum load is imposed.

Further, the second embodiment can also be modified appropriately in such a manner that the two pieces of bearing metal 20a, 20b are assembled at a slant according to the structure of the housing or subjected to the machining into a crowned shape and so on as shown in FIGS. 3 and 4.

What is claimed is:

1. A plain bearing in which two pieces of semicylindrical bearing metal are combined together along axially extending side edges to provide a bearing with a circular internal cross-section, one of the bearing metal pieces being located on a main-load side and being coated on an inner surface thereof with a thin overlay having a uniform thickness, while the other bearing metal piece located on a non-load side is coated on an inner surface thereof with an overlay having a uniform thickness greater than that of the overlay formed on the inner surface of the main-load side bearing metal piece, and wherein the total radial thickness including the thin overlay of the main-load side bearing metal piece is equal to the total radial thickness including the thin overlay of the non-load side bearing metal piece.

2. A plain bearing comprising a first semicylindrical bearing metal piece having opposite circumferential side edges extending in an axial direction, and a second semicylindrical bearing metal piece having opposite circumferential side edges extending in said axial direction, said first semicylindrical bearing metal piece being combined together with said second semicylindrical bearing metal piece along said axially extending side edges to provide a bearing having a generally circular internal cross-section with a substantially constant radius along at least said second semicylindrical bearing metal piece and along regions of said first semicylindrical bearing metal piece adjacent said opposite circumferential side edges thereof, the inner surface of said first semicylindrical bearing metal piece comprising a first overlay, the inner surface of said second semicylindrical bearing metal piece comprising a second overlay having a substantially uniform thickness, and wherein said first overlay is thinner than said second overlay of said second semicylindrical bearing metal piece at least along a portion of said first semicylindrical bearing metal piece where a maximum load is imposed.

3. The plain bearing of claim 2, wherein said first overlay of said first semicylindrical bearing metal piece has a thickness of 2–15 $\mu$m along at least said portion where a maximum load is imposed, and said second overlay of uniform thickness of said second semicylindrical bearing metal piece has a thickness greater than said thickness of 2–15 $\mu$m.

4. A plain bearing according to claim 3, wherein both said first overlay and said second overlay comprise alloys of lead.

5. The plain bearing of claim 2, wherein said first overlay of said first semicylindrical bearing metal piece has a uniform thickness.

6. The plain bearing of claim 2, wherein said first overlay of said first semicylindrical bearing metal piece has a gradually increasing thickness from said portion where maximum load is imposed toward said opposite circumferential side edges.

* * * * *